US005661886A

United States Patent [19]

Smith

[11] Patent Number: 5,661,886

[45] Date of Patent: Sep. 2, 1997

[54] COMBINATION CLIP INSTALLATION AND CRIMPING TOOL

[76] Inventor: Jimmy M. Smith, HC 33 Box 2580, Boise, Id. 83706

[21] Appl. No.: 490,712

[22] Filed: Jun. 15, 1995

[51] Int. Cl.$^{6}$ ........ B23P 11/00

[52] U.S. Cl. ........ 29/243.56; 29/268; 29/243.5; 29/283.5; 81/426; 81/426.5

[58] Field of Search ........ 29/243.56, 268, 29/283.5, 243.5; 81/426, 426.5

[56] References Cited

U.S. PATENT DOCUMENTS

| | | | |
|---|---|---|---|
| 715,674 | 12/1902 | Lemon | 81/426 |
| 902,570 | 11/1908 | Ellis | 81/426 |
| 3,688,380 | 9/1972 | Hofmann et al. | 29/243.56 |
| 4,386,543 | 6/1983 | Walker, Jr. | 81/420 |
| 4,713,959 | 12/1987 | Bennett | 72/410 |
| 5,020,202 | 6/1991 | Turrell | 29/243.56 |

*Primary Examiner*—Timothy V. Eley
*Assistant Examiner*—Lee Wilson
*Attorney, Agent, or Firm*—Joseph W. Holland

[57] ABSTRACT

A combination tool for installation and crimping TDC clips for fastening sections sheet metal fabrication one to another having first and second levers. The levers are secured at a common pivot point with the levers each having opposing first and second jaws. The first jaw means has a cross-sectional configuration which is substantially similar to the cross-sectional configuration of the TDC clip. The second jaw pivotally opposes the first jaw for securing the TDC clip for placement and is configured so as to provide a surface for crimping the TDC clip once the clip is positioned.

6 Claims, 4 Drawing Sheets

COMBINATION CLIP INSTALLATION AND CRIMPING TOOL

BACKGROUND OF THE INVENTION

1. Technical Field

This invention relates to hand tools, and more specifically to a hand tool used for crimping clips of a specific configuration which are used for joining sections of sheet metal fabrication, one to the other.

2. Background

A variety of articles of manufacture are fabricated by cutting, bending and otherwise forming sheet metal. Duct work for heating, ventilating and air conditioning purposes is often times fabricated from sheet metal. Typically, sections having a variety of configurations and dimensions are prefabricated in a shop setting where the prefabrication can be done more easily, more efficiently and more cost effectively. The sections of fabricated sheet metal are then transported to the job site where they are to be installed. The prefabricated sections are set in place, typically by hanging or otherwise supporting the sections. The sections are then joined one to another, forming a completed system.

A number of methods have been utilized for joining fabricated sections of sheet metal, including screwing, welding and fastening by a variety of mechanical means. One method of joining the prefabricated sections involves forming a flange at the ends of the sheet metal fabrications which are to be joined. The flanges are then butted one up against another and secured by a mechanical clip known as a TDC clip. The TDC clip is a mechanical connector formed of sheet metal and is secured to the pair of flanges by hooking a lip formed on the clip under the edge of the first flange and forcing, by a lever action, the clip over the outside edge of the second flange. The clip is formed in such a way that it is approximately 6" long having a first leg with a lip for grabbing the outside edge of the first flange. Opposite the clip lip is a longer second leg. The clip first and second legs are joined together by a bridge section. Once the clip is placed over the two flanges as described above, the second leg is crimped, securing the clip in place, joining the flange sections.

The TDC clip is installed with two separate operations: First, an installation or positioning procedure wherein the clip is snapped over the outside edges of the adjoining flanges, and second, a crimping operation wherein the second leg of the clip is crimped to secure the connector into place.

These operations or procedures have been accomplished by the use of two separate tools. First, a placement tool having a cross-sectional configuration corresponding to the cross-sectional configuration of the TDC clip. The placement tool has a lip which secures the clip for placement over the outside edge of the first flange. The placement tool further comprises a lever means for levering the clip over the outside edge of the second flange. Once this operation is complete, the placement tool is removed and a separate crimping tool is used for crimping the leg of the TDC clip to complete the operation. The crimping tool presently used is configured such that it allows crimping only at one point at a time, and the installer must start at one end of the clip, crimping along the full length of the clip.

What is needed is a single tool which can accomplish both the installation and the crimping functions which are presently performed using two separate tools. Such a tool would have the advantage of allowing for quicker and more efficient installation of the TDC clips, and therefore the sheet metal duct work itself. Additionally, such a tool would provide the advantage of eliminating one tool from the sheet metal worker's already overcrowded tool belt.

Finally, the present invention would also have the advantage of providing for a quicker and more consistent installation of the TDC clip, thereby increasing the overall quality of the installation job.

DISCLOSURE OF INVENTION

Therefore, one object of the present invention is to provide a tool which combines both the installation and crimping functions of the two tools presently used for installing and crimping TDC clips.

A second object of the present invention is to eliminate one tool from the sheet metal worker's already overcrowded tool belt.

Another object of the present invention is to allow the crimping process to be completed in a single operation, rather than a series of operations. An object of the present invention is to provide a means for installing the TDC clip with a level of consistent quality for each installation.

These objects are accomplished by a hand tool having first and second lever means, the lever means being secured at a common pivot point, the lever means each having separate handle means and opposing jaw means. The first jaw means has a cross-sectional configuration similar to the cross-sectional configuration of the TDC clip itself. The second jaw means opposes the first jaw means for securing the TDC clip for placement and is configured so as to provide a surface for crimping the TDC clip once the clip is positioned.

BEST MODE FOR CARRYING OUT INVENTION

Figure 1:
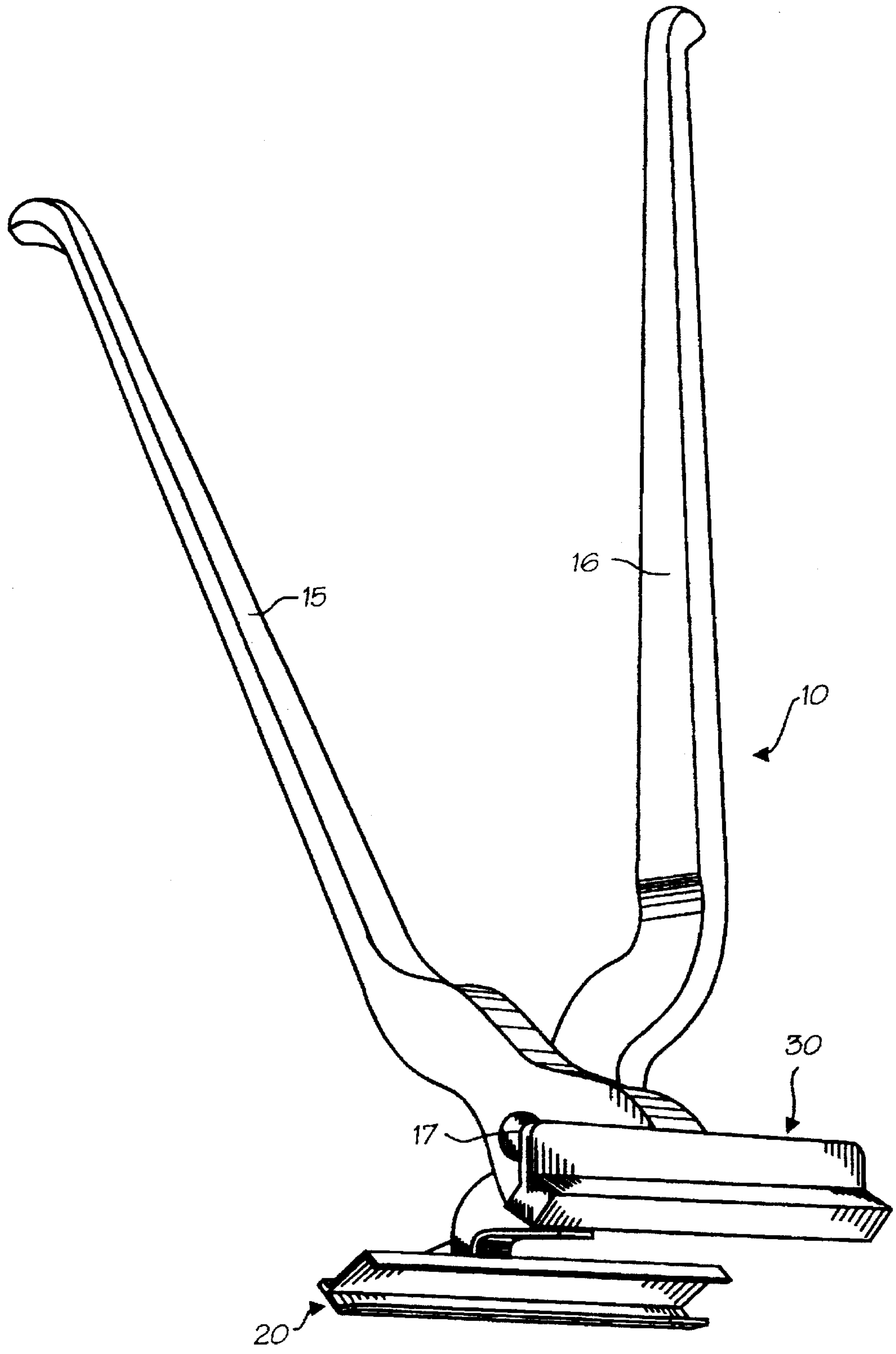
FIG. 1 is a perspective representational view of the preferred embodiment of the combination clip installation and crimping tool.

Referring now to FIGS. 1 through 4, the preferred embodiment of the combination clip installation and crimping tool is shown to advantage. In FIG. 1, the general configuration of the preferred embodiment of combination clip installation and crimping tool 10 is shown to advantage. Combination clip installation and crimping tool 10 comprises generally a first handle means 15 and second handle means 16 being pivotally connected by pivot pin 17 in such a manner so that when first handle means 15 and second handle means 16 are drawn together, die head 20 and punch head 30 are drawn together.

Figure 2:
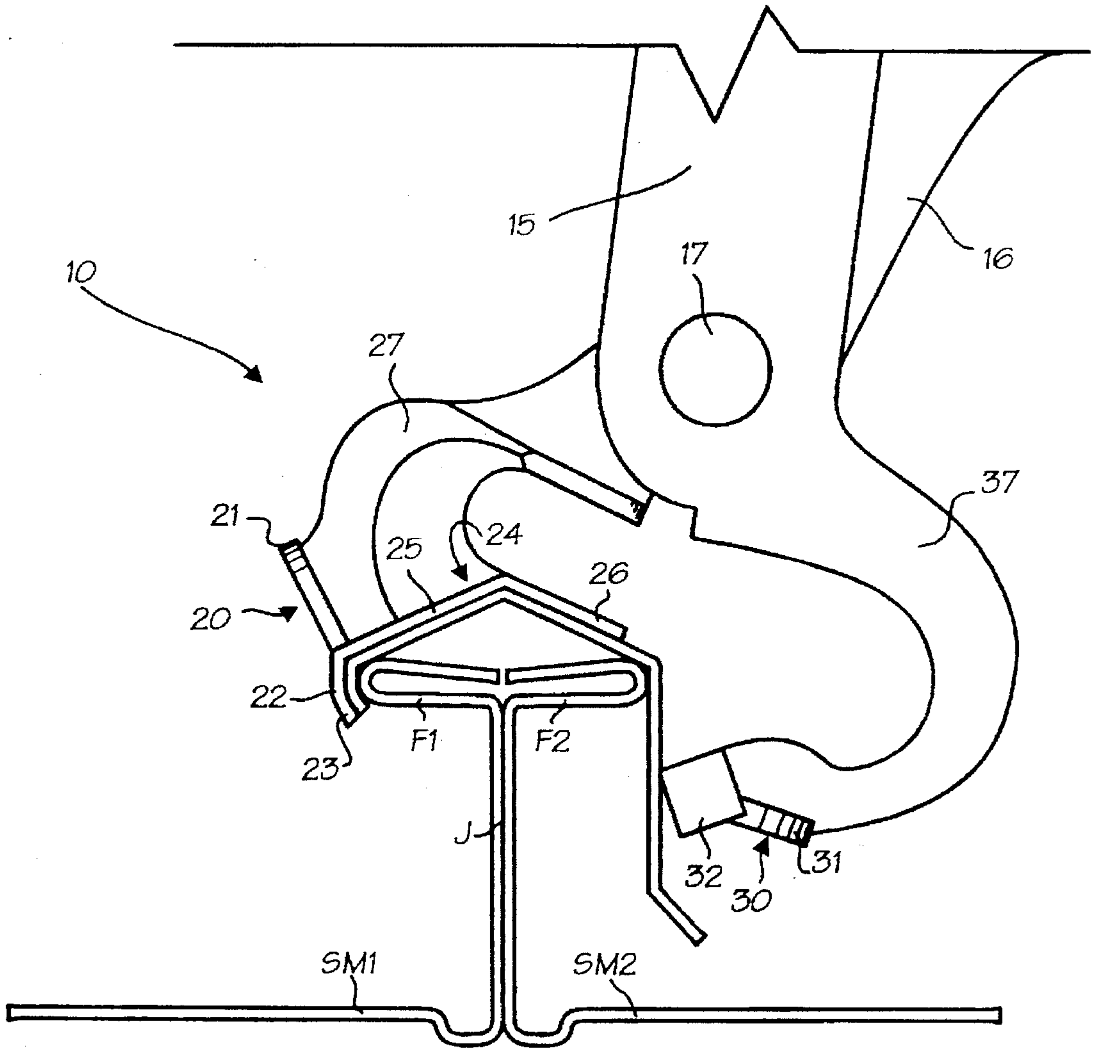
FIG. 2 is a representative side view of the combination clip installation and crimping tool.
Figure 3:
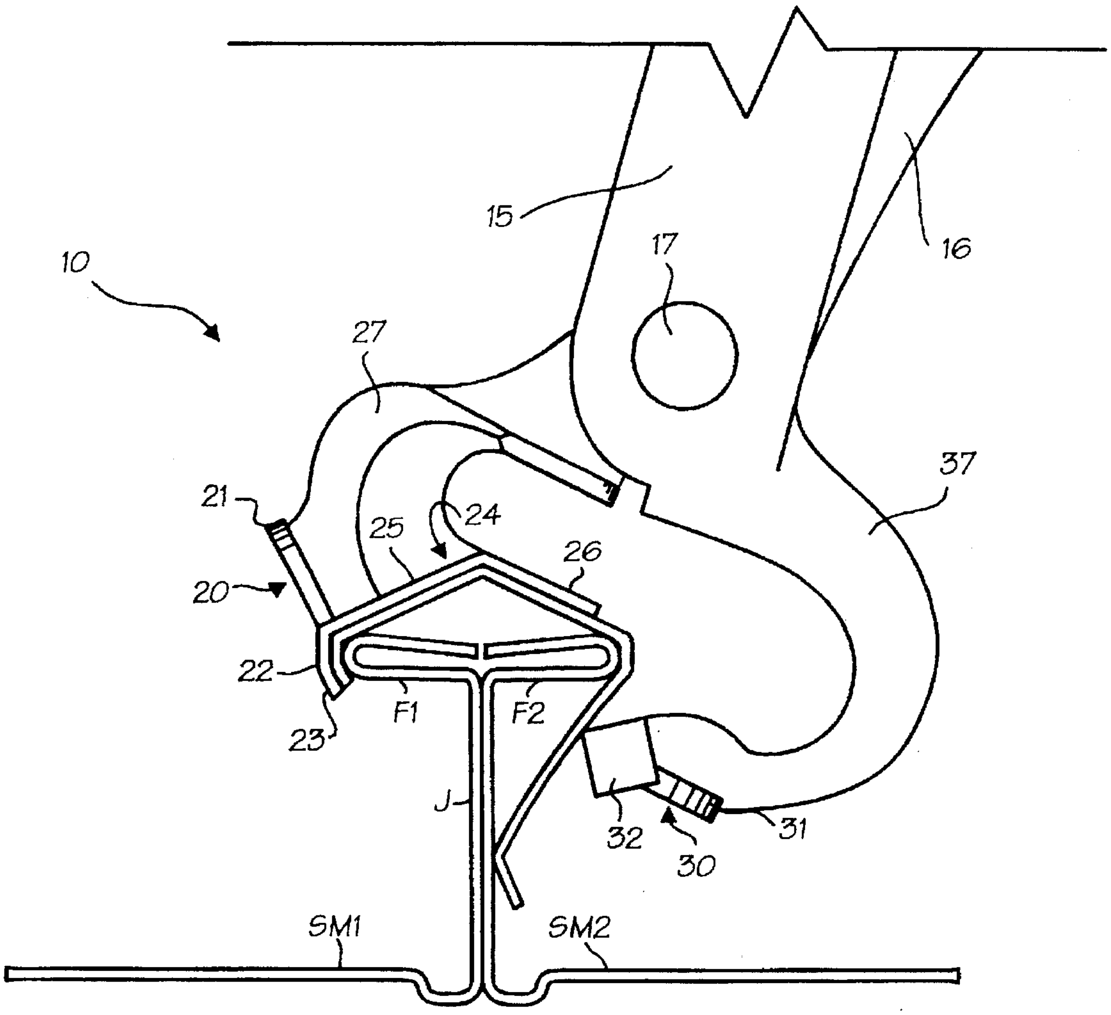
FIG. 3 is a representative side view of the combination installation and crimping tool.
Figure 4:
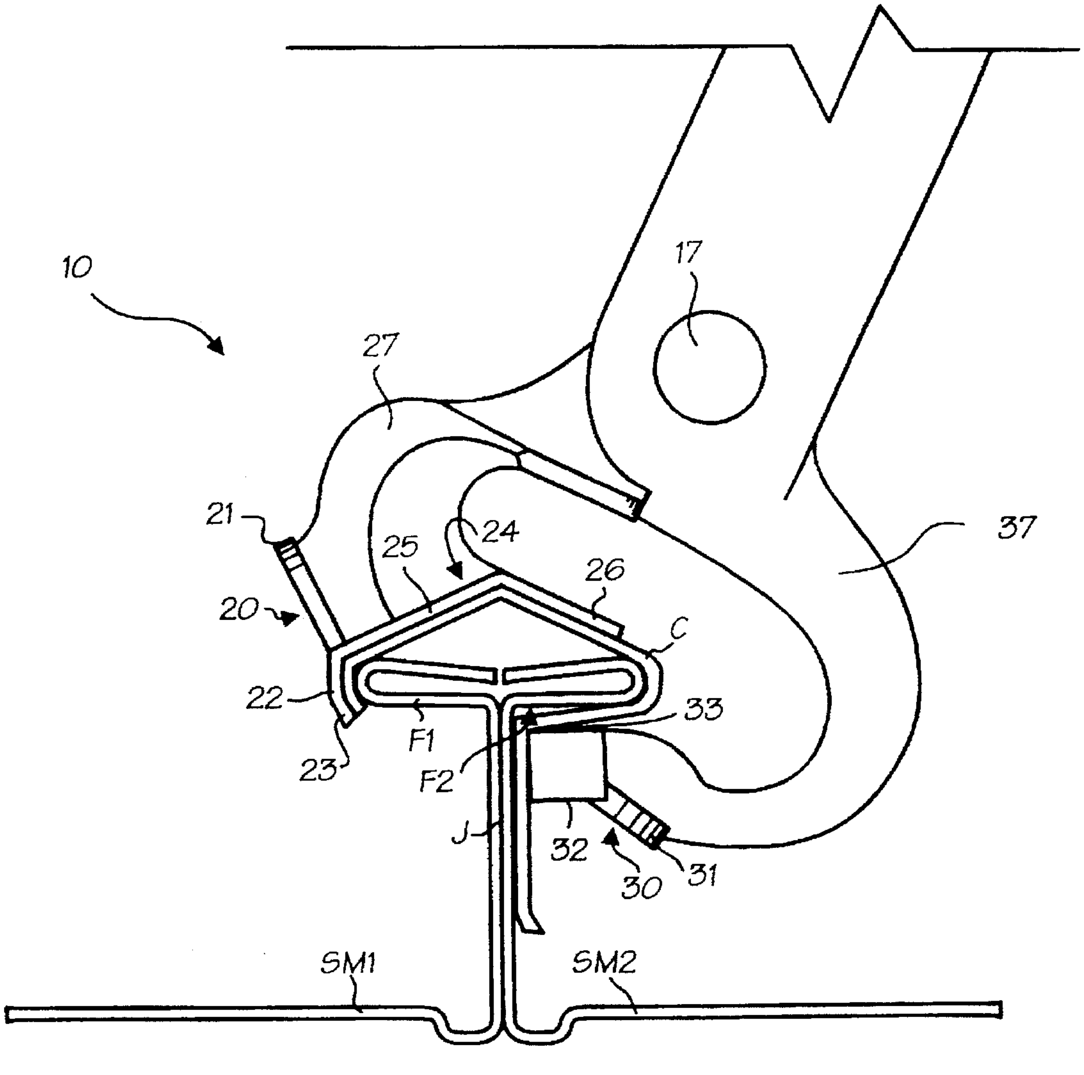
FIG. 4 is a representative side view of the combination installation and crimping tool.

Referring to FIGS. 2 through 4, die head 20 and punch head 30 are shown to advantage. Die head 20 is permanently attached at the end die jaw means 27. In the preferred embodiment, die head 20 is reinforced by die head strongback 21. Die head jaw 27 is simply an extension of second handle means 16 beyond pivot pin 17. Die head 20 comprises generally, die head bridge 24, having a longitudinal axis which lies perpendicular to the plane defined by the pivotal movement of either first handle means 15 or second handle means 16 about pivot pin 17. Die head bridge 24 comprises generally, die head bridge first leg 25 and die head bridge second leg 26. Die head bridge 24 further comprises die head grip leg 22 having die head grip lip 23 attached thereto. In the preferred embodiment, the cross-sectional configuration of die head bridge 24 has a cross-sectional configuration which is substantially similar to the cross-sectional configuration of TDC clip C, die head bridge 24 being slightly larger overall to allow die head bridge 24 to saddle over TDC clip C, the first edge of TDC clip C being grasped by die head grip lip 23.

Punch head jaw 37 is effectively a continuation of first handle means 15 beyond pivot pin 17. Attached at the end of punch head jaw 37 is punch head 30. Punch head 30 is pivotally opposed to die head 20. Punch head 30 comprises generally punch head crimp 32 and punch head crimping edge 33 both having a longitudinal axis which lies perpendicular to the plane defined by the pivotal movement of either first handle means 15 or second handle means 16 about pivot pin 17. Punch head crimping edge 33 is pivotally opposed to the lower surface of die head bridge 24. Punch head 30 further comprises punch head strongback 31.

In operation, the combination clip installation and crimping tool is used as follows: First and second sheet metal sections SM1 and SM2 are butted one up against the other. Each of the first and second sheet metal sections SM1 and SM2 are prefabricated, having flanges F1 and F2, respectively. TDC clip C is placed in combination clip installation and crimping tool 10 with the bridge section of TDC clip C fitting snugly into die head bridge 24. The lip of TDC clip C is hooked over the outside edge of either flange section with the aid of the combination clip installation and crimping tool 10. Die head 20 is formed such that the cross-sectional configuration of die head 20 is substantially similar to the cross-sectional configuration of TDC clip C. Die head grip lip 23 is formed in a manner so that it grips and secures TDC clip C first edge and holds it securely against flange F1. Die head bridge 24 spans across the top surface of TDC clip C.

Once TDC clip C is positioned as described above, a rotational force is exerted at the upper ends first handle means 15 and second handle means 16 first handle means 15 and second handle means 16 snapping TDC clip C in position as shown in FIGS. 2.

Punch head 30 is positioned such that punch head crimp 32 with punch head crimping edge 33 is positioned securely against the second leg of TDC clip C. Once the combination clip installation and crimping tool 10 is so positioned, a firm gripping force is exerted against first handle means 15 and second handle means 16 so that TDC clip C is held firmly in and between die head 20 and punch head 30. At this point, a rotational force is exerted at the ends of first handle means 15 and second handle means 16, drawing sheet metal sections SM1 and SM2 snugly together, forcing TDC clip C down over flanges F1 and F2. At this point, TDC clip C is held by compression over flanges F1 and F2.

Next, the gripping force which is exerted against first handle means 15 and second handle means 16 is increased, causing punch head 30 to draw in towards die head 20, crimping the second leg of TDC clip C, thereby increasing the compressive force exerted by TDC clip C against joint J formed by the abutting sheet metal sections SM1 and SM2.

In the preferred embodiment, punch head crimping edge 33 is configured such that as die head 20 and punch head 30 are drawn together, the leading edge of punch head crimping edge 33 is drawn towards die head bridge first leg 25, along a plane which extends perpendicular to die head bridge first leg 25. In this fashion, a maximum crimping force can be exerted by punch head 30 against die head 20.

It should also be noted that field installation of fabricated sections often times involve working in rather cramped and constricted conditions. It should be clearly understood that while the illustrations 1 through 4 depict combination clip installation and crimping tool 10 as having straight first handle means 15 and second handle means 16, that the angle of the handle means relative to the jaws may be varied to accommodate installation procedures in more restricted environments.

Additionally, it should be understood that while the preferred embodiment is shown as having forged first and second handle means with die head 20 and punch head 30 being a welded fabrication, that combination clip installation and crimping tool 10 may be formed entirely by forging, welding, casting or any other combination of fabrication means.

While there is shown and described the present preferred embodiment of the invention, it is to be distinctly understood that this invention is not limited thereto but may be variously embodied to practice within the scope of the following claims.

I claim:

1. A tool for installation and crimping clips for fastening sections of sheet metal fabrication one to another comprising:

a first handle having first and second ends;

a second handle having first and second ends, the second handle being pivotally attached to the first handle;

a pivot pin pivotally attaching the first handle to the second handle;

a die head bridge having a plurality of planar segments configured to substantially conform to the shape of the clip, the plurality of planar segments including a first planar segment having a first edge and a second edge, the first planar segment being attached to the second end of the second handle, a second planar segment being attached to and extending from the first planar segment at an obtuse angle, a third planar segment also being attached to and extending from the first planar segment at an obtuse angle and away from the second planar segment, and a fourth planar segment being attached to and extending from the third planar segment at an obtuse angle toward the second planar segment; and a punch head attached to the second end of the first handle, the punch head having a punch head crimping edge being pivotally opposed to the die head bridge.

2. The tool for installation and crimping clips for fastening sections sheet metal fabrication one to another of claim 1 wherein the punch head further comprises a punch head crimp, the punch head crimp having a rectangular cross-sectional configuration, the punch head crimping edge being formed by a corner of the punch head crimp rectangular cross-sectional configuration.

3. A tool for installation and crimping clips for fastening sections of sheet metal fabrication one to another comprising:

a first handle having first and second ends;

a second handle having first and second ends, the second handle being pivotally attached to the first handle;

a pivot pin pivotally attaching the first handle to the second handle;

a die head jaw attached to the second handle second end, the die head jaw having a lower concave face having a plurality of planar segments connfigured to substantially conform to the shape of the clip, each of the plurality of planar segments having a longitudinal axis which lies perpendicular to the plane defined by the pivotal movement of the first handle and the second handle, each of the plurality of planar segments having a first edge and a second edge, the die head jaw including, a first planar segment, the first planar segment attached to the second end of the second handle, a second planar segment, second planar segment second edge attached to and extending from the first planar segment first edge at an obtuse angle, a third planar segment, the third planar segment first edge attached to and extending away from the first planar segment second edge at an obtuse angle, and a fourth planar segment, the fourth planar segment first edge attached to and extending away from the third planar segment second edge at an obtuse angle; and a punch head attached to the second end of the first handle, the punch head having a punch head crimping edge pivotally opposed to the die head jaw.

4. The tool for installation and crimping clips for fastening sections sheet metal fabrication one to another of claim 3 wherein the punch head further comprises a punch head crimp, the punch head crimp having a rectangular cross-sectional configuration, the punch head crimping edge being formed by a corner of the punch head crimp rectangular cross-sectional configuration.

5. A tool for installation and crimping clips for fastening sections of sheet metal fabrication one to another comprising:

a first handle having first and second ends;

a second handle having first and second ends, the second handle being pivotally attached to the first handle;

a die head bridge being attached to the second end of the second handle, the die head bridge having a plurality of planar segments configured to substantially conform to the shape of the clip, the plurality of planar segments including a first planar segment having a first edge and a second edge, the first planar segment, a second planar segment being attached to and extending from the first planar segment at an obtuse angle, a third planar segment also being attached to and extending from the first planar segment at an obtuse angle and away from the second planar segment, and a fourth planar segment being attached to and extending from the third planar segment at an obtuse angle toward the second planar segment; and a punch head attached to the second end of the first handle, the punch head having a punch head crimping edge being pivotally opposed to the die head bridge.

6. The tool for installation and crimping clips for fastening sections sheet metal fabrication one to another of claim 5 wherein the punch head further comprises a punch head crimp, the punch head crimp having a rectangular cross-sectional configuration, the punch head crimping edge being formed by a corner of the punch head crimp rectangular cross-sectional configuration.

* * * * *